US009699781B2

United States Patent
Nguyen et al.

(10) Patent No.: US 9,699,781 B2
(45) Date of Patent: Jul. 4, 2017

(54) COMMUNICATIONS NODE

(71) Applicant: NEC Corporation, Minato-ku, Tokyo (JP)

(72) Inventors: Phong Nguyen, Victoria (AU); Yuanrong Lan, Victoria (AU)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 14/423,556

(22) PCT Filed: Aug. 30, 2013

(86) PCT No.: PCT/JP2013/005145
§ 371 (c)(1),
(2) Date: Feb. 24, 2015

(87) PCT Pub. No.: WO2014/057604
PCT Pub. Date: Apr. 17, 2014

(65) Prior Publication Data
US 2016/0205680 A1    Jul. 14, 2016

(30) Foreign Application Priority Data

Oct. 12, 2012    (AU) .............................. 2012904479

(51) Int. Cl.
H04W 72/04    (2009.01)
H04L 5/14    (2006.01)
H04L 5/22    (2006.01)

(52) U.S. Cl.
CPC .......... H04W 72/0446 (2013.01); H04L 5/14 (2013.01); H04L 5/22 (2013.01)

(58) Field of Classification Search
CPC .... H04W 72/0446; H04W 72/12; H04L 5/14; H04L 5/22
See application file for complete search history.

(56) References Cited

U.S. PATENT DOCUMENTS

2011/0110262 A1*    5/2011    Yu ..................... H04L 1/0025
                                            370/252
2013/0188516 A1*    7/2013    He ..................... H04W 28/16
                                            370/254

(Continued)

FOREIGN PATENT DOCUMENTS

CN    101114868 A    1/2008
RU    2435305 C1    11/2011

(Continued)

OTHER PUBLICATIONS

International Search Report for PCT Application No. PCT/JP2013/005145, mailed on Dec. 3, 2013.

(Continued)

Primary Examiner — Pao Sinkantarakorn
Assistant Examiner — Kabir Jahangir

(57) ABSTRACT

According to an exemplary embodiment, a communications node for use in a communications system wherein the communications node is adapted to: transmit to user equipments (UEs) within a node coverage area a first uplink-downlink configuration within a first time interval; and transmit to selected user equipments (UEs) within the node coverage area secondary uplink-downlink configurations over a plurality of secondary time intervals within the first time interval, wherein the secondary uplink-downlink configurations contain information on reconfigurable subframes within the first uplink-downlink configuration which can be reconfigured by the communications node for use by one or more of the selected UEs.

15 Claims, 10 Drawing Sheets

(56) References Cited

U.S. PATENT DOCUMENTS

| | | | |
|---|---|---|---|
| 2013/0223298 A1* | 8/2013 | Ahn | H04B 7/2643 370/280 |
| 2013/0272170 A1* | 10/2013 | Chatterjee | H04W 28/02 370/280 |
| 2014/0010213 A1 | 1/2014 | Wang et al. | |
| 2014/0153449 A1* | 6/2014 | Seo | H04L 1/1607 370/280 |

FOREIGN PATENT DOCUMENTS

| | | |
|---|---|---|
| WO | 2006/016457 A1 | 2/2006 |
| WO | 2010/009645 A1 | 1/2010 |
| WO | 2012/134580 A1 | 10/2012 |
| WO | 2013069218 A1 | 5/2013 |

OTHER PUBLICATIONS

Intel Corporation, Discussion on methods to support different time scales for TDD UL-DL reconfiguration, 3GPP TSG-RAN WG1 #69 R1-122647, May 21-25, 2012. Cited in ISR.

Renesas Mobile Europe Ltd., Discussion on Enhancements for Dynamic TDD UL-DL Configuration, 3GPP TSG-RAN WG1 Meeting #69 R1-122363, May 21-25, 2012. Cited in ISR.

Samsung, Dynamic reconfiguration of TDD UL-DL configuration, 3GPP TSG-RAN WG1#69 R1-122267, May 21-25, 2012. Cited in ISR.

3GPP TS 36.211 V10.5.0 (Jun. 2012). Cited in Specification. 3rd Generation Partnership Project, "Evolved Universal Terrestrial Radio Access (E-UTRA); Physical Channels and Modulation(Release 10)" 3GPP TS 36.211, Jun. 2012, V10.5.0.

3rd Generation Partnership Project, Alcatel-Lucent Shanghai Bell, Alcatel-Lucent, "Methods to support different time scales for TDD UL-DL reconfiguration", 3GPP TSG RAN WG1 Meeting #69, R1-122508, Prague, Czech Republic, May 21-25, 2015, pp. 1-2.

3rd Generation Partnership Project, CATT, "Methods to support different UL/DL reconfiguration time scales for FS_LTE_TDD_eIMTA", 3GPP TSG RAN WG1 Meeting #69, R1-122062, Prague, Czech Republic, May 21-25, 2015, pp. 1-3.

3rd Generation Partnership Project, LG Electronics, "TDD DL-UL Reconfiguration Methods for eIMTA", 3GPP TSG RAN WG1 Meeting #69, R1-122318, Prague, Czech Republic, May 21-25, 2015, pp. 1-5.

3rd Generation Partnership Project, Nokia Siemens Networks, Nokia, LGE, NEC, "Definition of Bit Mapping for DCI Signalling", 3GPP TSG-RAN Meeting #54, R1-083448, Jeju, Korea, Aug. 18-22, 2008.

Extended European Search Report for EP Application No. EP13845075.4 dated on Aug. 2, 2016.

Russian Office Action for RU Application No. 2015109564 dated Mar. 17, 2016 with English Translation.

\* cited by examiner

COMMUNICATIONS NODE

This application is a National Stage Entry of PCT/JP2013/005145 filed on Aug. 30, 2013, which claims priority from Australian Patent Application 2012-904479 filed on Oct. 12, 2012, the contents of all of which are incorporated herein by reference, in their entirety.

TECHNICAL FIELD

The present invention relates to a communications node. In particular although not exclusively the present invention relates to the configuration of uplink and downlink subframe allocations in a communications system incorporating Time Division Duplex (TDD).

BACKGROUND ART

Presently the Long Term Evolution (LTE) standard accommodates both paired spectrum for Frequency Division Duplex, FDD and unpaired spectrum for Time Division Duplex, TDD operation. LTE FDD using the paired spectrum is anticipated to form the migration path for the current 3G services being used around the globe, most of which use FDD paired spectrum. However there has been an additional emphasis on including TDD LTE using unpaired spectrum. TDD LTE which is also known as TD-LTE is seen as providing the evolution or upgrade path for Time Division-Synchronous Code Division Multiple Access (TD-SCDMA).

One benefit of deploying the LTE TDD system is that it is possible to dynamically change the Uplink (UL) and Downlink (DL) capacity ratio to match demand. More specifically LTE-TDD permits asymmetric UL-DL allocations in a radio frame. Asymmetric resource allocation is realized by providing seven different semi-statically configured UL-DL subframe configurations for a given frame, as being specified in Table 4.2-2 3rd Generation Partnership Project (3GPP) TS 36.211 v10.5.0 (2012 June). These allocations can provide between 40% and 90% DL subframes. Typically the UL-DL configuration in use is signalled to UEs (and changed) via system information provided on the dedicated broadcast channel. Consequently the UL-DL configuration is only semi-statically configured and so may not adapt/match to the instantaneous traffic situation. This is inefficient in term of resource utilization, particularly in cells with a small number of users where the traffic situation typically changes more frequently.

To address the inefficiencies in UL-DL configuration during traffic fluctuations, a flexible TDD configuration has been considered for LTE-Advanced (LTE-A) Release 11. Studies on flexible TDD configurations have revealed significant performance benefits by allowing TDD UL-DL reconfiguration based on traffic adaptation in small cells. The studies also recommend interference mitigation scheme(s) for systems with TDD UL-DL reconfiguration.

SUMMARY OF INVENTION

Technical Problem

There are several challenges to overcome before any implementation of a flexible TDD UL-DL configuration may be considered viable. One of the most important challenges is to have a system design that allows the reconfiguration of TDD UL-DL configuration at most on radio frame basis without significant impact on the current 3GPP specification and allow the coexistence with legacy User Equipment (UE) (i.e Rel 8, 9, 10).

Clearly it would be advantageous to provide a flexible TDD UL-DL configuration on the existing LTE system without significant change on the legacy specifications as well as disruption to the coexistent legacy UE(s).

Solution to Problem

Accordingly in one aspect of the present invention there is provided a communications node for use in a communications system wherein the communications node is adapted to:

transmit to user equipments (UEs) within a node coverage area a first uplink-downlink configuration within a first time interval; and transmit to selected user equipments (UEs) within the node coverage area secondary uplink-downlink configurations over a plurality of secondary time intervals within the first time interval, wherein the secondary uplink-downlink configurations contain information on reconfigurable subframes within the first uplink-downlink configuration which can be reconfigured by the communications node for use by one or more of the selected UEs.

Preferably the communications network is an LTE network and the communications node is configured for operation at LTE Release 11 or higher. Suitably the communications node services one or more UEs configured for operation on LTE release 8, LTE Release 9 and/or LTE Release 10. The communications node may be configured to transmit the secondary uplink-downlink configuration to UEs configured for operation on LTE release 11 or higher.

Suitably the first uplink-downlink configuration is broadcast using system information block type 1 (SIB1) and the first time interval has a typical period of 640 ms. The communications node is preferably configured to transmit the secondary uplink-downlink configurations to the selected UEs in accordance with a fast signalling approach. The secondary uplink-downlink configurations may be derived from the available time division duplex (TDD) uplink (UL)-downlink (DL) configurations defined under the LTE TDD standards. In such instance the available TDD UL-DL configurations may be divided into groups based on the uplink to downlink switch point periodicity.

In some embodiments of the invention the reconfigurable subframes are identified in each group of uplink-downlink configurations by identifying subframes common to all configurations within a group and assigning the remaining subframes as reconfigurable subframes. Preferably the secondary uplink-downlink configurations are transmitted as downlink control information (DCI). The DCI's cyclic redundancy check (CRC) may be scrambled using a radio network temporary identifier (RNTI) which indicates that the DCI is utilised for fast uplink-downlink reconfiguration.

In some embodiments of the invention the secondary time intervals may have a duration of between 10 ms and 40 ms. Preferably each of the secondary time intervals has a duration of at least one radio frame and the DCI is transmitted within the first downlink subframe of each secondary time interval. In such instances the DCI may include information on a TDD configuration of the current secondary interval and the next incoming secondary interval.

In some embodiments of the present invention each of the secondary time interval may have a period of between 10 ms and 40 ms. Preferably each of the secondary time intervals have a duration of at least one radio frame and the DCI(s) is transmitted within each secondary time interval over a first downlink subframe in the first half of a secondary time interval, and a predetermined second downlink subframe in the second half of the same secondary time interval. In such cases the DCI transmitted within the first downlink subframe may include information on a TDD configuration of a current secondary interval and the DCI transmitted on the second downlink subframe may include information on a TDD configuration of the next incoming secondary interval.

In some embodiments of the present invention the DCI may also include information consisting of the TDD configuration of neighbouring cell(s) or cluster(s) that may be used for interference mitigation or/and management in addition to the TDD configuration of the radio frames.

Suitably the physical downlink shared channel (PDSCH) hybrid automatic repeat request (HARQ) timing, in a each group, is based on PDSCH HARQ timing of the uplink-downlink configuration within the selected group that has downlink subframes which are a superset of other configurations in the same group.

Preferably physical uplink shared channel (PUSCH) transmission and PUSCH hybrid automatic repeat request (HARQ) timing for a group is based on the PUSCH transmission and PUSCH HARQ timing of the uplink-downlink configuration that has uplink subframes which are superset of other configurations in the same group.

In another aspect of the present invention there is provided a method of configuring uplink-downlink configuration allocations for a user equipment (UE) within the coverage area of a communications node of a communications network, the method including:

transmitting to each UE within a node coverage area a first uplink-downlink configuration; and transmitting to selected user equipments (UEs) within the node coverage area secondary uplink-downlink configurations over a plurality of secondary time intervals within the first time interval, wherein the secondary uplink-downlink configurations contain information on reconfigurable subframes within the uplink-downlink configuration which can be reconfigured by the communications node for use by one or more of the selected UEs.

In yet a further aspect of the present invention there is provided a user equipment for use in a communications network, the user equipment adapted to:

receive a first uplink-downlink configuration over a first time interval from a servicing node within a communications network; and receive secondary uplink-downlink configurations from said servicing node over a plurality of secondary time intervals within the first time interval, wherein the secondary uplink-downlink configurations contain information on reconfigurable subframes within the uplink-downlink configuration which can be reconfigured by the servicing node for use by the user equipment, and wherein the user equipment is adapted to provide feedback to the servicing node to enable the servicing node to configure the reconfigurable subframes as uplink or downlink subframes.

In yet another aspect of the present invention there is provided a method implemented in a user equipment for use in a communications network, the method comprising:

receiving a first uplink-downlink configuration over a first time interval from a servicing node within a communications network; and receiving secondary uplink-downlink configurations from said servicing node over a plurality of secondary time intervals within the first time interval, wherein the secondary uplink-downlink configurations contain information on reconfigurable subframes within the uplink-downlink configuration which can be reconfigured by the servicing node for use by the user equipment, and wherein the user equipment is adapted to provide feedback to the servicing node to enable the servicing node to configure the reconfigurable subframes as uplink or downlink subframes.

In yet another aspect of the present invention there is provided a communications system comprising:

user equipments (UEs); and a communications node to transmit to the UEs within a node coverage area a first uplink-downlink configuration within a first time interval, wherein the communications node transmits to selected user equipments (UEs) within the node coverage area secondary uplink-downlink configurations over a plurality of secondary time intervals within the first time interval, and wherein the secondary uplink-downlink configurations contain information on reconfigurable subframes within the first uplink-downlink configuration which can be reconfigured by the communications node for use by one or more of the selected UEs.

In yet another aspect of the present invention there is provided a method implemented in a communications system, the method comprising:

transmitting from a communications node to user equipments (UEs) within a node coverage area a first uplink-downlink configuration within a first time interval; and transmitting from the communications node to selected user equipments (UEs) within the node coverage area secondary uplink-downlink configurations over a plurality of secondary time intervals within the first time interval, wherein the secondary uplink-downlink configurations contain information on reconfigurable subframes within the first uplink-downlink configuration which can be reconfigured by the communications node for use by one or more of the selected UEs.

The reference to any related art in this specification is not, and should not be taken as an acknowledgement or any form of suggestion that the related art forms part of the common general knowledge.

Advantageous Effects of Invention

According to the present invention, it is possible to provide a flexible TDD UL-DL configuration on the existing LTE system.

BRIEF DESCRIPTION OF DRAWINGS

In order that this invention may be more readily understood and put into practical effect, reference will now be made to the accompanying drawings, which illustrate preferred embodiments of the invention, and wherein.

DESCRIPTION OF EMBODIMENTS

Figure 1:
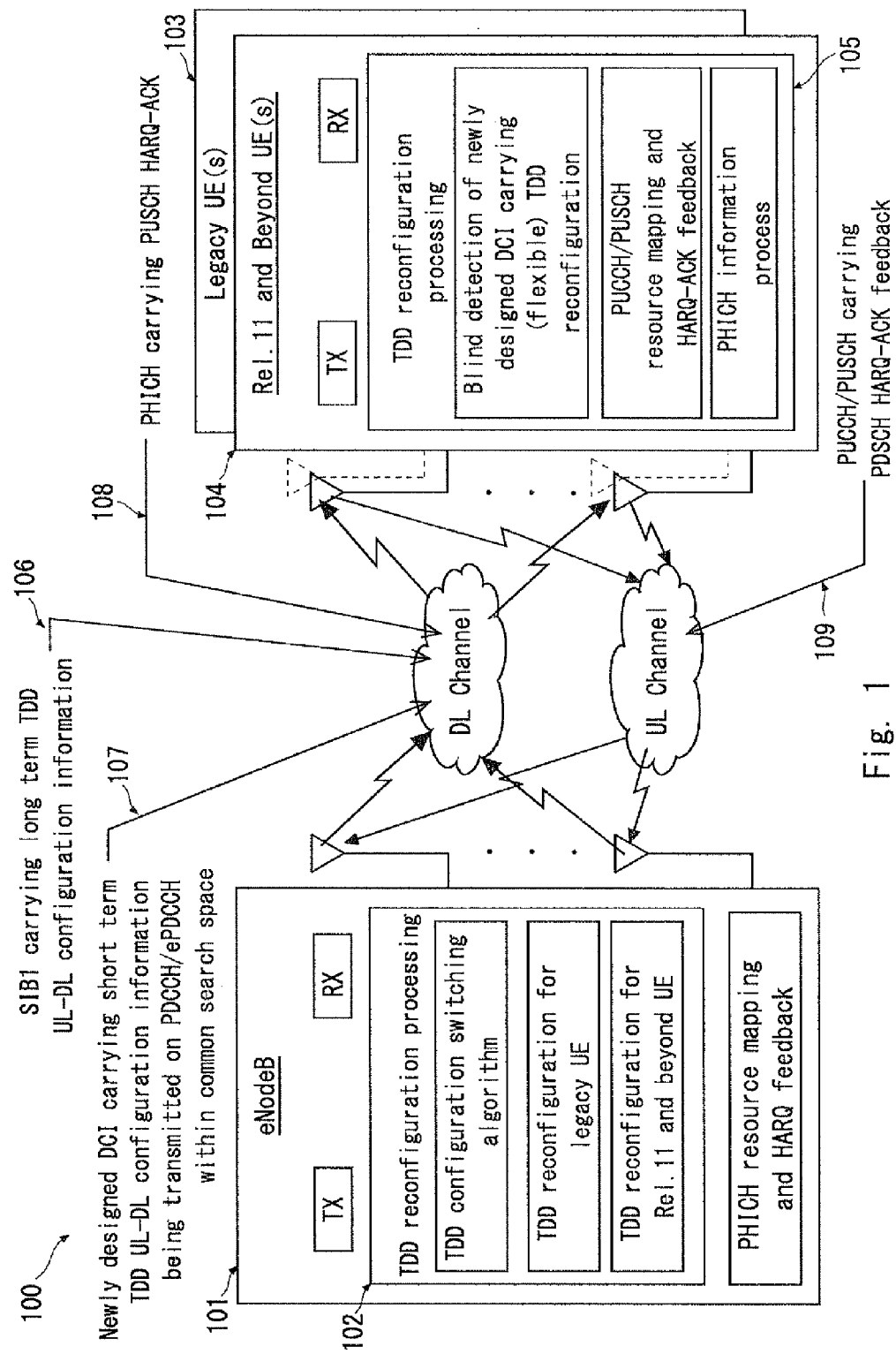
FIG. 1 is a schematic diagram depicting a wireless communication system supporting flexible TDD UL-DL configuration.

With reference to FIG. 1 there is illustrated a wireless communication system 100 that supports flexible TDD UL-DL configuration. The depicted wireless communication system 100 includes one or more evolved NodeBs (eNB) 101 which provide wireless connectivity and access to a plurality of wireless terminals/portable communication devices (UEs) 103, 104. As can be seen in this example the eNB 101 is configured for operation under the LTE release 11 standard and beyond but is backward compatible with previous releases such as Rel'8, Rel'9 and Rel'10. In this instance UE(s) 103 is a legacy UE i.e. UE device configured for operation on LTE Rel'8, Rel'9 and/or Rel'10 specification, while UE(s) 104 is configured for operation on LTE Rel'11 (and beyond).

The eNB 101 in this instance includes a TDD reconfiguration processing function 102, which takes the UL-DL traffic ratio observed in unrestricted timeframe into consideration when it performs TDD configuration switching algorithm for the selection of appropriate long term and short term TDD UL-DL configuration for legacy UE(s) 103 and Rel'11 & beyond UE(s) 104. In this example the eNB 101 broadcasts long term TDD UL-DL configuration to legacy UE(s) 103 and Rel'11& beyond UE(s) 104 using System Information Block type 1 (SIB1) 106. The TDD UL-DL configuration transmitted on SIB1 is considered as long term configuration as the period for SIB1 update is the order of 640 ms.

The eNB 101 is also configured to communicate short term TDD UL-DL configuration to only Rel'11 & beyond UE(s) 104 using fast signalling approach. More specifically the eNB 101 transmits the short term TDD UL-DL configuration in the form of newly designed Downlink Control Information (DCI) 107 that is transmitted on Physical Downlink Control Channel (PDCCH) or Enhanced PDCCH (ePDCCH) within common search space. The CRC of this DCI is scrambled with a new Radio Network Temporary Identifier (RNTI) named eIMTA-RNTI, which indicates the DCI is used for the purpose of fast TDD UL-DL reconfiguration. The TDD UL-DL configuration included on the newly designed DCI is considered as short term configuration as the period for TDD UL-DL configuration update can be as frequent as 10 ms (i.e. radio frame basis).

Thus in the example depicted in FIG. 1 the legacy UE(s) 103 operating within the coverage area of an eNB 101 configured for Rel'11 and beyond, use TDD UL-DL configuration broadcasted on SIB1 and operate according to the legacy specifications based on the TDD UL-DL received on the SIB1. The eNB 101 may not schedule legacy UE(s) 103 to perform the reception of PDSCH(s) or transmission of PUSCH(s) on flexible subframes. The concept of flexible subframes is discussed in further detail below.

By contrast the Rel'11& beyond UE(s) 104 operating within coverage of the eNB 101 in addition to performing the reception and use of TDD UL-DL configuration broadcasted on SIB1, need to process the Short term TDD UL-DL configuration. As shown in this example the UE(s) 104 configured for operation on Rel'11 and beyond include a TDD reconfiguration processing function 105 which performs blind detection of newly designed DCI carrying the updated short term UL-DL configuration information. This function 105 also performs PDSCH H-ARQ encoding and selecting the appropriate UL subframe(s) for sending PDSCH H-ARQ feedback to eNB 101. PDSCH H-ARQ feedback is carried by Physical Uplink Control Channel (PUCCH)/PUSCH 109. In addition the TDD reconfiguration processing function 105 performs the determination of DL subframe on which it will monitor for its UL grant and determination of DL subframe on which it will receive Physical Hybrid Automatic Repeat Request Indicator Channel (PHICH) 108 carrying H-ARQ corresponding to Uplink-Shared Channel (UL-SCH) that it sent in previously granted UL-subframe(s) using the timing rules discussed in greater detail below.

As noted above LTE TDD currently provides 7 TDD UL-DL configurations. These 7 configurations are shown in table 1 below.

TABLE 1

Uplink-downlink configurations LTE TDD

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 2:
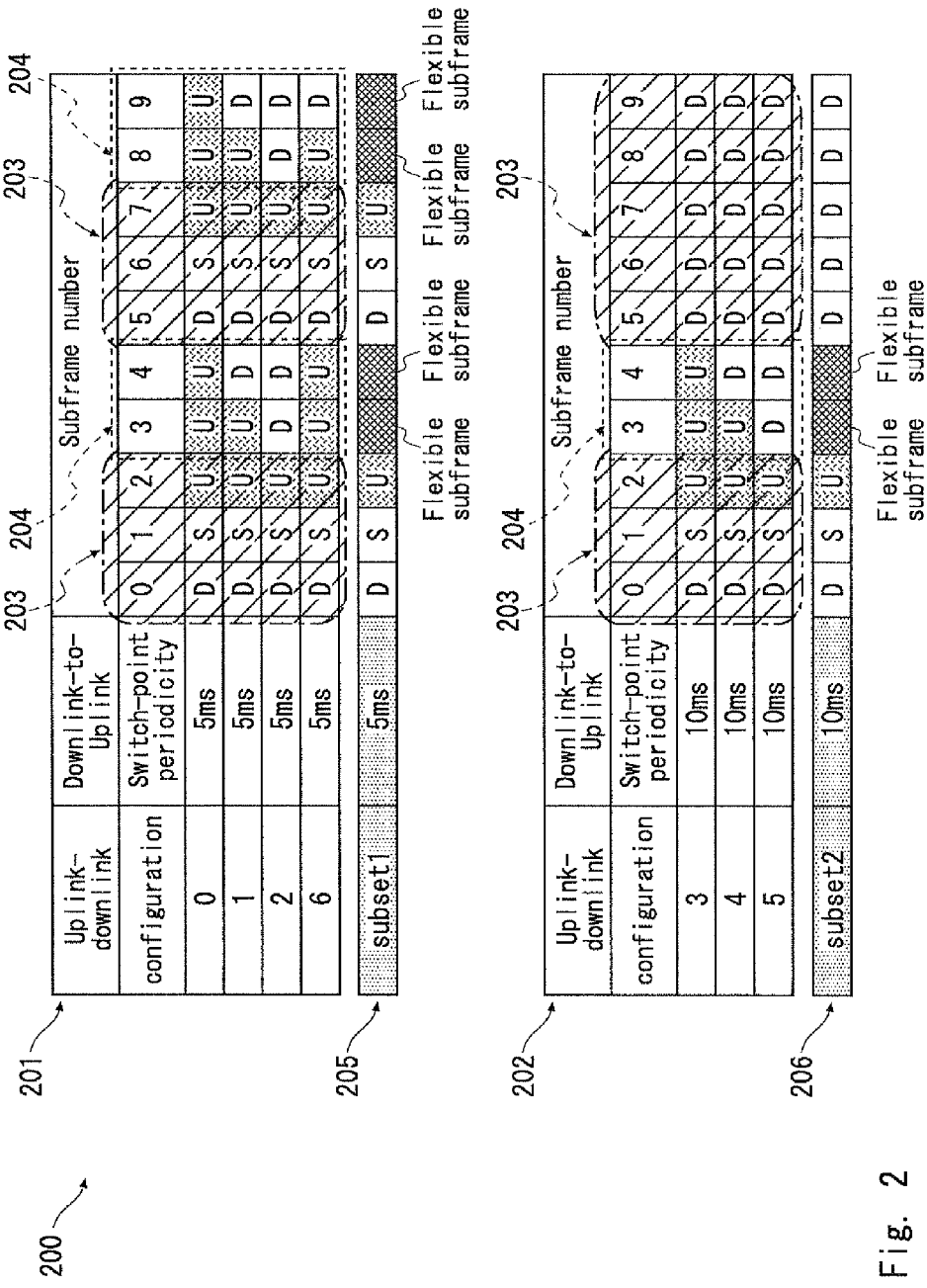
FIG. 2 is a schematic diagram depicting a grouping method for TDD UL-DL configuration according to one embodiment of the present invention.

In order to maximise the degree of flexibility in term of short term TDD UL-DL configuration selection while still maintaining minimum impact to 3GPP specifications for adopting flexible TDD UL-DL configuration embodiments of the present invention utilise the concept of configurable/flexible subframe(s). FIG. 2 depicts the determining appropriate subframe(s) which can be used as flexible subframes 200. As can be seen from table 1 the subframes can be configured by eNB 101 to be either as DL subframe(s), UL subframe(s) or special S subframes. In order to determine which subframes can be used flexible subframes the TDD UL-DL configurations are divided into groups 201, 202 corresponding to DL-to-UL Switch-point periodicity. For the current LTE TDD super-group of 7 TDD UL-DL configurations (super-group), there are 2 possible switch-point periodicity groupings. One grouping 201 corresponding to 5 ms DL-to-UL Switch-point periodicity and one grouping 202 corresponding to 10 ms DL-to-UL Switch-point periodicity.

Within each identified group 201, 202 of subframe(s) it can be seen there are common subframe assignments. With various subframes within each identified group 201, 202 being allocated as all Downlink, all special or all Uplink subframes 203. The remaining subframe(s) 204 which are not assigned as DL, UL or S can be used as flexible subframe, which can then be reconfigured by eNB 101 to be either DL or UL subframes on radio frame basis.

As can be from FIG. 2 grouping the subframes in this manner produces 2 subsets. Subset #1 205 corresponds to 5 ms DL-to-UL Switch-point periodicity having subframes 3, 4, 8 and 9 as flexible subframe(s). While Subset #2 206 corresponds to 10 ms DL-to-UL Switch-point periodicity having subframes 3, and 4 as flexible subframe(s). To minimise the impact on the 3GPP specifications, it is proposed that the short term TDD UL-DL configuration reconfigure is restricted within TDD UL-DL configurations available in a group. Where the long term TDD UL-DL configuration reconfigure can be selected within all TDD UL-DL configurations available in a super-group.

Figure 3:
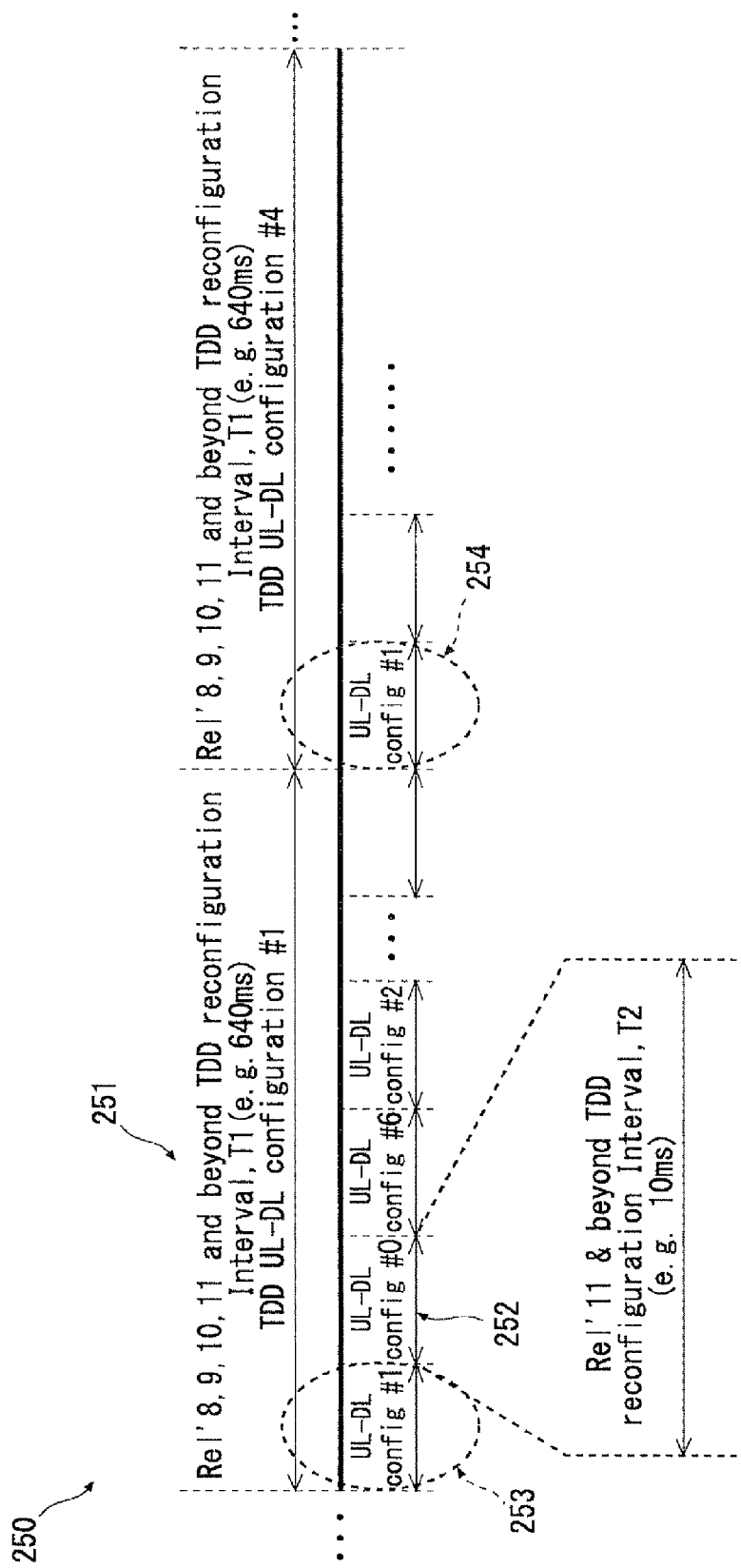
FIG. 3 is a schematic diagram illustrating both long term and short term TDD UL-DL configuration reconfiguration according to one embodiment of the present invention.

The concept of long term and short term TDD UL-DL configurations reconfiguration is further illustrated in FIG. 3. As shown the system 250 has a long term TDD UL-DL configuration 251 valid for interval T1, and a short term TDD UL-DL configuration 252 valid for interval T2. As can be seen intervals T1 consists of a multiple number of T2 intervals, while each T2 interval consists of one or a multiple number of radio frames. The eNB 101 may only change TDD UL-DL configurations at T1 boundary between each T1 interval. Based on DL-UL traffic of all serviced UEs, the eNB 101 may select any TDD UL-DL configuration in available in a super-group for a T1 interval. Based on DL-UL traffic of all Rel'11& beyond UEs and maybe legacy UE(s). The eNB 101 may select any TDD UL-DL configuration in available in a group for a T2 interval.

As can be seen in the example depicted in FIG. 3 the TDD UL-DL configuration of the first T2 interval 253 that has starting boundary immediately following the starting boundary of interval T1, is configured by the eNB to have the same TDD UL-DL configuration group as the current T1 interval. In this case the TDD UL-DL configuration of first T2 interval has the same TDD UL-DL configuration #1 of its parent T1 interval. In additional to TDD UL-DL configuration #1, the eNB may configure the first T2 interval to have TDD UL-DL configuration #0, 2 or 6.

In some instances the eNB 101 may configure TDD UL-DL configuration on the first T2 interval differently from the TDD UL-DL configuration group of its parent T1 interval particularly in the case of collision or in cases where UE 104 may wrongly detect the eNB configured TDD UL-DL configuration. As can be seen in this instance TDD UL-DL configuration of the boundary T2 interval 254 has TDD UL-DL configuration #1 belonging to group 201 while the TDD UL-DL configuration of its parent T1 interval has TDD UL-DL configuration #4 belonging to group 202. In such instances UE(s) 104 configured for operation on LTE Rel'11 and beyond will ignore the detected T2's TDD UL-DL configuration and apply the received T1's TDD UL-DL configuration for the reception of PDSCH and transmission of PUSCH until it successfully receives a newly designed DCI that carries a new short term TDD UL-DL configuration that belongs to the same group as UL-DL configuration #4.

As noted above in order to permit the use of short term TDD UL-DL configuration a newly design DCI is provided. There are a number of methods for the transmission of the new DCI carrying the short term TDD UL-DL configuration FIGS. 4 and 5 depict two exemplary methods for the transmission of the new DCI.

Figure 4:
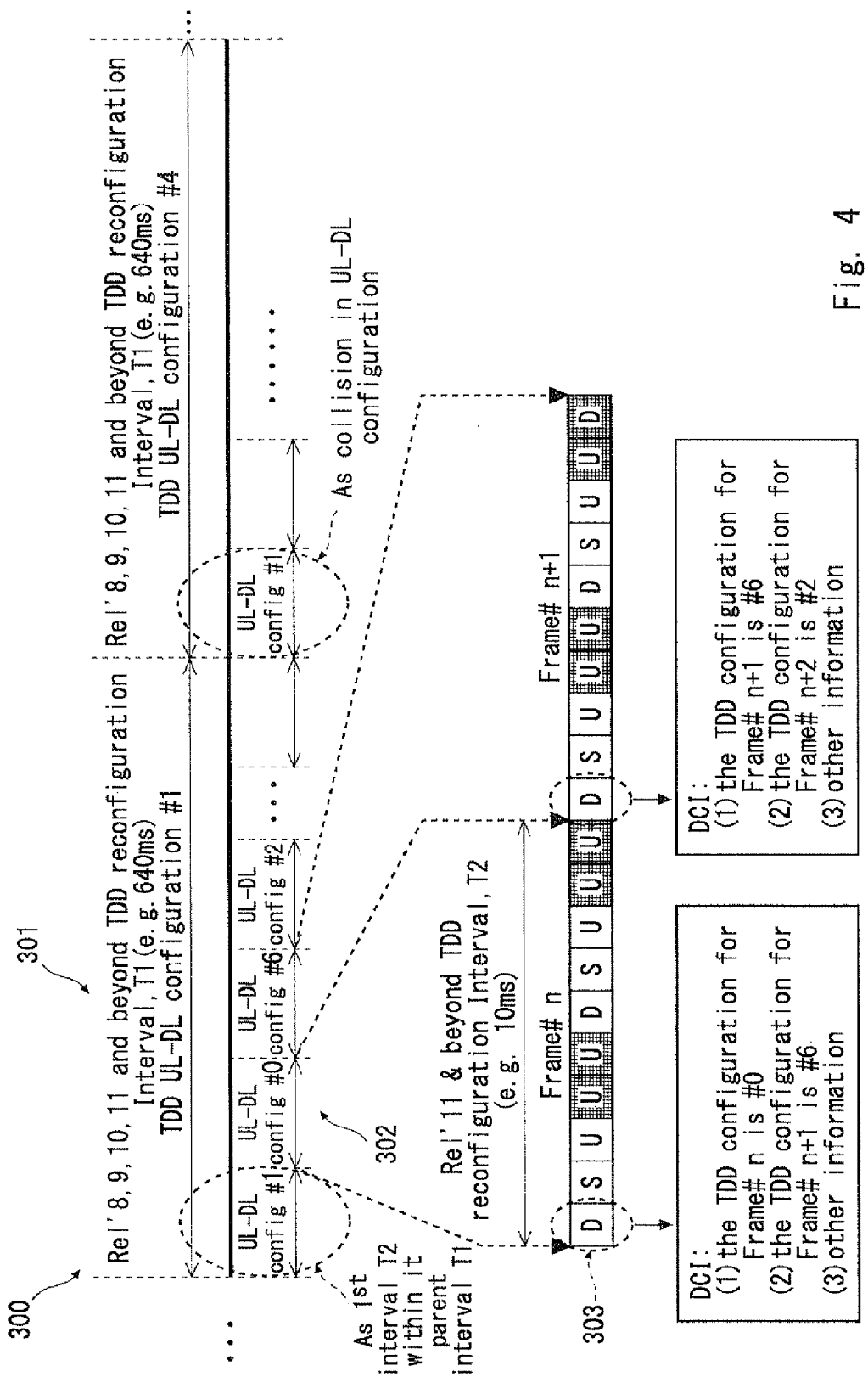
FIG. 4 is a schematic diagram depicting transmission of DCI carrying reconfiguring short term TDD UL-DL configuration according to one embodiment of the present invention.

With reference to FIG. 4, there is illustrated one configuration (transmission scheme) 300 for the transmission of the DCI in accordance with one embodiment of the present invention. As shown a long term TDD UL-DL configuration 301 which valid for T1 intervals is provided, and a short term TDD UL-DL configuration 302 valid for T2 intervals. In each T2 interval, the 1st DL subframe 303 is selected by eNB 101 for the transmission the newly designed DCI. The newly designed DCI includes the short term TDD UL-DL configuration for the current T2 interval and also include the short term TDD UL-DL configuration for the next incoming T2 interval as well as other necessary information including TDD configuration of neighbouring cell(s) or cluster(s) that may be used for interference mitigation or/and management.

Figure 5:
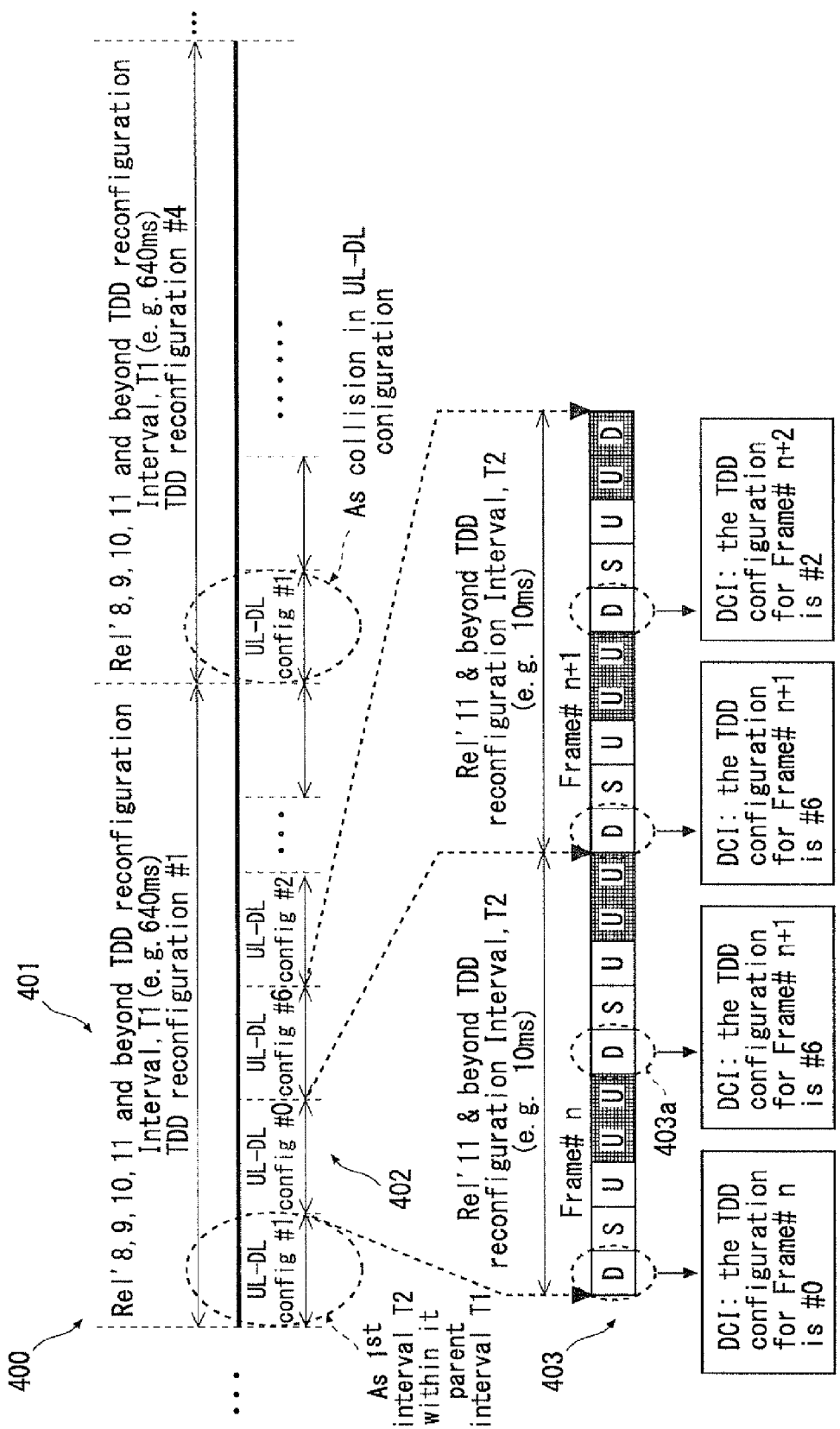
FIG. 5 is a schematic diagram depicting transmission of DCI carrying reconfiguring short term TDD UL-DL configuration according to one embodiment of the present invention.

FIG. 5 depicts an alternate transmission scheme 400 for the transmission of the DCI in accordance with one embodiment of the present invention. As in the case above a long term TDD UL-DL configuration 401 valid for T1 intervals, and a short term TDD UL-DL configuration 402 valid for T2 intervals. In each T2 interval, the first DL subframe 403 is selected eNB 101 to transmit a first DCI. This first DCI includes the short term TDD UL-DL configuration for the current interval T2 as well as other necessary information. On the same T2 interval, the eNB 101 selects a second DL subframe 403*a* that belongs to the second half of the T2 interval for the transmission of a second DCI. The second DCI includes the short term TDD UL-DL configuration for the next incoming T2 interval as well as other necessary information.

In either of the transmission schemes depicted in FIGS. 4 and 5, when UE(s) 104 configured for operation on LTE Rel'11 and beyond successfully receive the short term TDD UL-DL configuration for the current T2 interval, it will compare with the short term TDD UL-DL configuration being configured for its in the immediate previous T2 interval if there is one. If there is a match, the UE will apply the short term TDD UL-DL configuration and associated timing rule for the current interval T2. Otherwise, it may apply the TDD UL-DL configuration received on SIB1.

As can be seen from the above discussion timing rules are utilised by the present invention to facilitate flexible TDD designs. For example timing rules are utilised for PDSCH HARQ resource mapping, PUSCH transmission and PUSCH HARQ resource mapping. In order to avoid significant specification(s) change and providing forward capability to future 3GPP releases, the timing table defined under current 3GPP standards for LTE TDD is reused.

Figure 6:
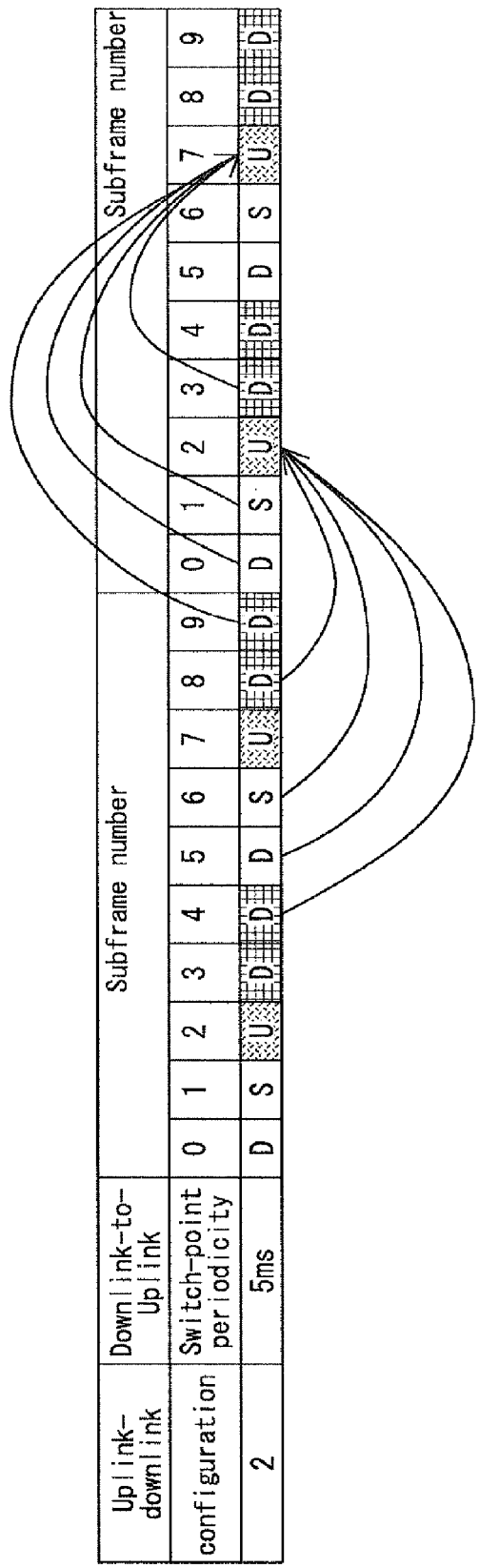
FIG. 6 is a schematic diagram depicting the HARQ timing for PDSCH when TDD configuration in subset#1 is selected.
Figure 7:
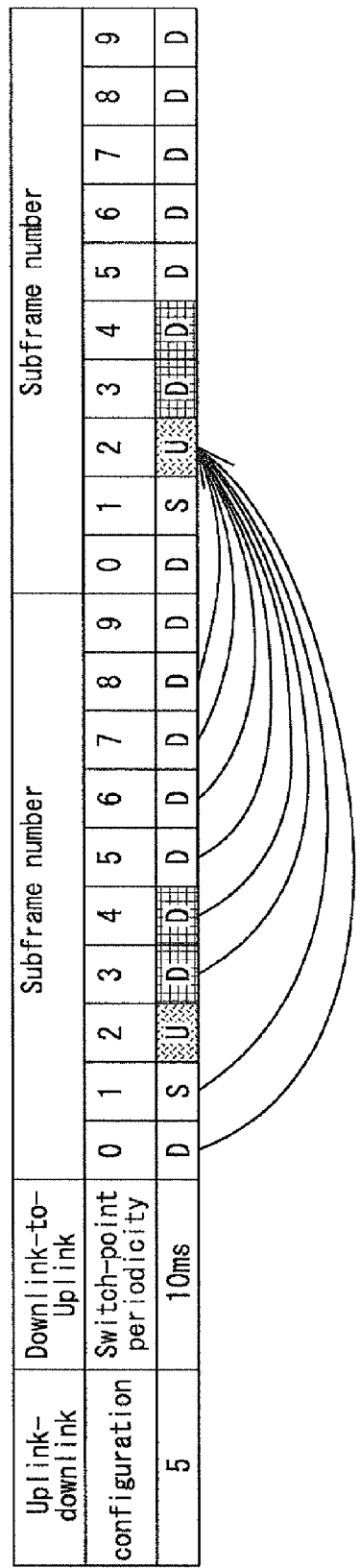
FIG. 7 is a schematic diagram depicting the HARQ timing for PDSCH when TDD configuration in subset#2 is selected.

In one embodiment the PDSCH HARQ timing rule, for a group, may be based on the PDSCH HARQ timing of the configuration that has downlink subframes being a superset of other configurations in the same group. In the group 201 of FIG. 2, configuration 2 has downlink subframes being a superset of other configurations within the same group. As such, configuration 2 PDSCH HARQ timing is utilised for subset1 205. FIG. 6 illustrates configuration 2 PDSCH HARQ timing in accordance with the current LTE TDD standard. In the group 202 of FIG. 2, configuration 5 has downlink subframes being a superset of other configurations in the same group. Thus configuration 5 PDSCH HARQ timing is used for subset2 206. FIG. 7 illustrates configuration 5 PDSCH HARQ timing in accordance with the current LTE TDD standard.

Figure 8:
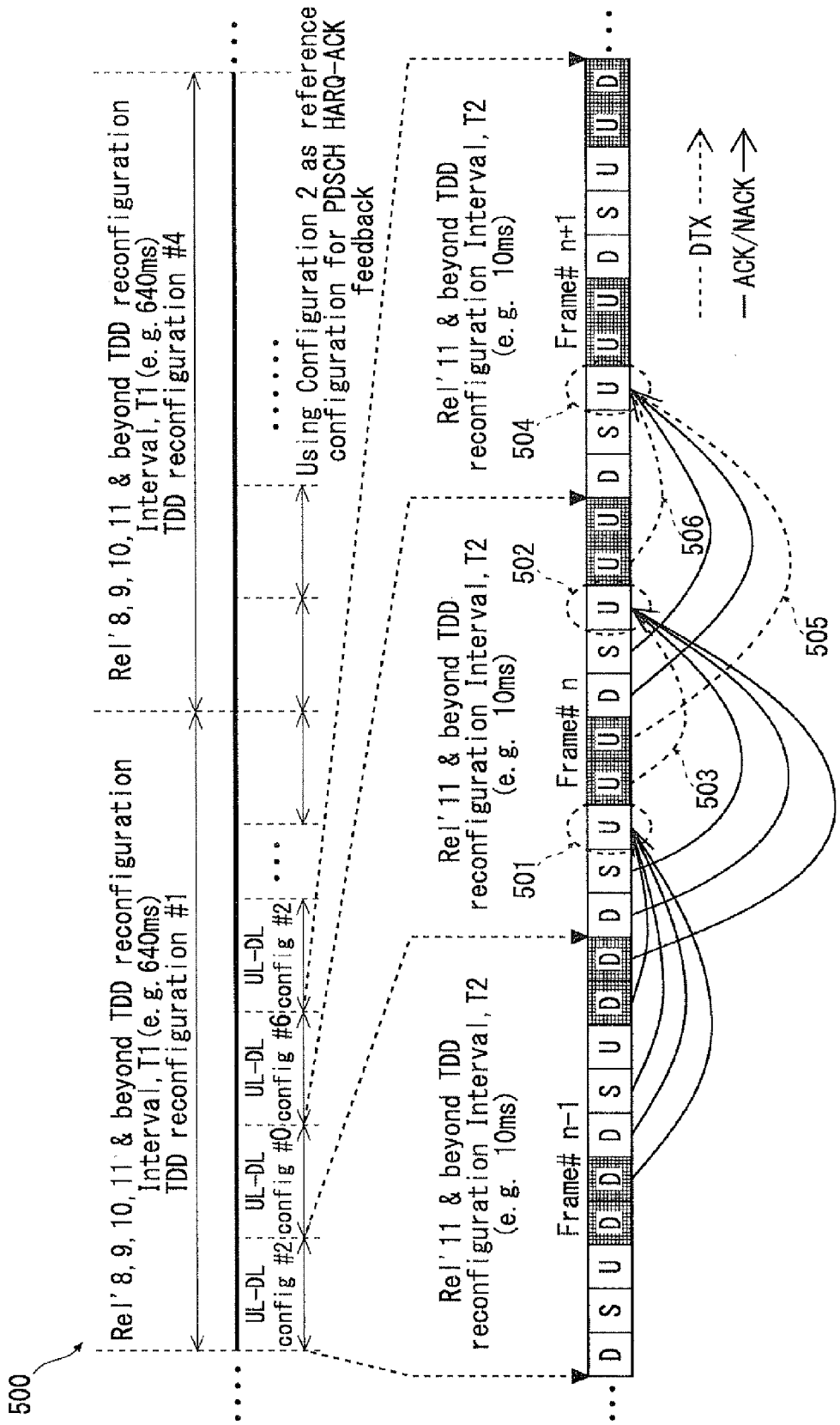
FIG. 8 is a schematic diagram depicting acknowledgment (ACK)/negative acknowledgment (NACK) feedback for PDSCH when TDD reconfiguration happens according to one embodiment of the present invention.

FIG. 8 depicts ACK/NACK feedback for PDSCH when TDD reconfiguration 500 occurs, utilising PDSCH HARQ timing based on the PDSCH HARQ timing of the configuration that has downlink subframes being a superset of other configurations in the same group. In this example, configuration 2 PDSCH HARQ timing is used and configured for radio frame (n−1). The proceeding radio frame (n) is then reconfigured with TDD UL-DL configuration 0, under the proposed timing rule the UL subframe 2 501 in radio frame (n) is still selected to carry HARQ feedback(s) for PDSCH(s) received in subframes 4, 5, 6 and 8 in radio frame (n−1). Also according to the proposed rule, the UL subframe 7 502 in radio frame (n) is selected to carry HARQ feedback(s) for PDSCH(s) received in subframe 9 in radio frame (n−1) and subframes 0, 1 and 3 in radio frame (n). As radio frame (n) is now configured with TDD UL-DL configuration 0, subframe 3 is no longer a DL subframe. To cope with the change in the configuration of subframe 3 a Discontinuous Transmission & Reception (DTX) bit(s) may be included by UE(s) 104 to facilitate the reusing of the existing LTE TDD PDSCH HARQ-ACK mapping table. In other words, the UL subframe 7 in radio frame (n) is selected to carry HARQ feedback(s) for PDSCH(s) received in DL subframe 9 in radio frame (n−1), subframes 0 and 1 in radio frame (n), and DTX bit 503 corresponding to DL subframe 3 in radio frame (n). In similar fashion, the next radio frame (n+1) is reconfigured with TDD UL-DL configuration 6 to accommodate instantaneous UL-DL traffic, the UL subframe 2 504 in radio frame (n+1) is selected to carry HARQ feedback(s) for PDSCH(s) received in DL subframes 5, and 6 in radio frame (n) and DTX bit(s) 505 & 506 corresponding to DL subframes 4 and 8 in radio frame (n).

Figure 9:
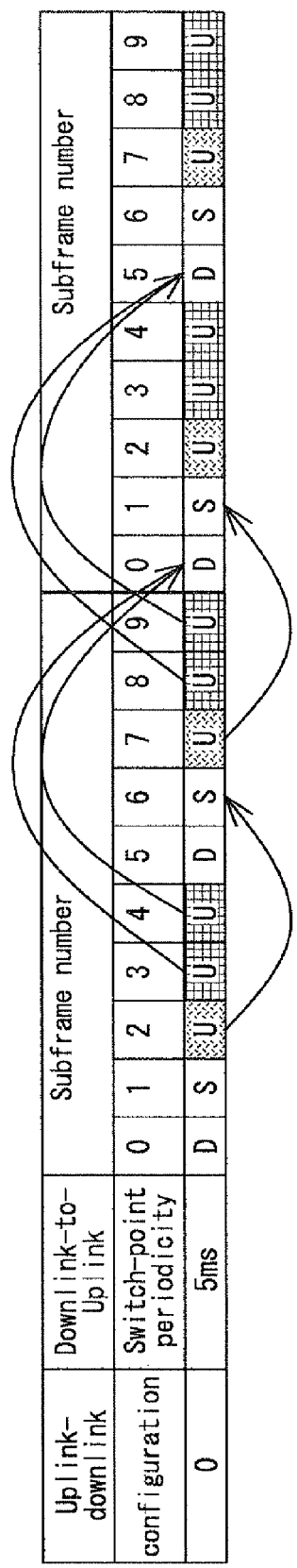
FIG. 9 is a schematic diagram depicting the HARQ timing for PUSCH when TDD configuration in subset#1 is selected.
Figure 10:
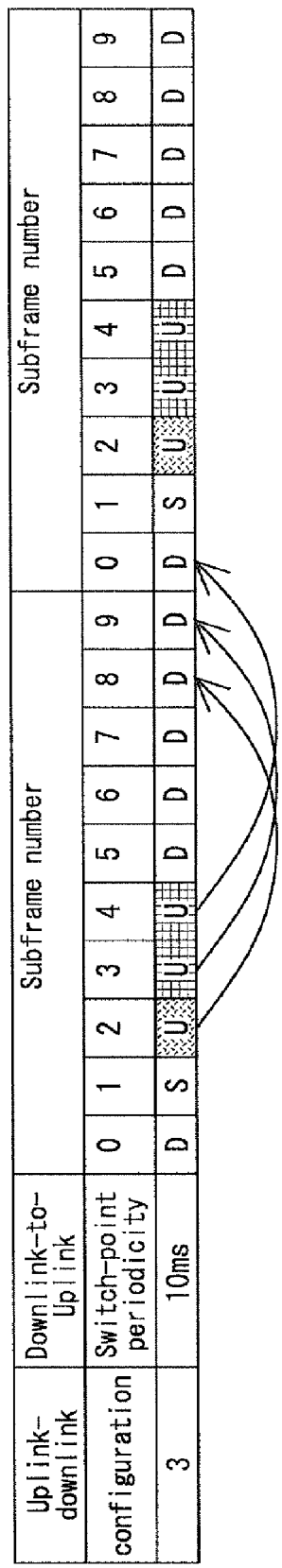
FIG. 10 is a schematic diagram depicting the HARQ timing for PUSCH when TDD configuration in subset#2 is selected.

In one embodiment PUSCH transmission and PUSCH HARQ timing rule, for a group, is based on the PUSCH transmission and PUSCH HARQ timing of the configuration that has uplink subframes being a superset of other configurations in the same group will be used for flexible TDD designed subset. For the group 201 shown in FIG. 2, configuration 0 has uplink subframes being a superset of other configurations in the same group, accordingly configuration 0 PUSCH transmission & PUSCH HARQ timing is used for subset1 205. FIG. 9 illustrates PUSCH transmission and PUSCH HARQ timing for configuration 0 in subset 1 utilising the timing table defined under current 3GPP standards for LTE TDD. In group 2 of FIG. 2, configuration 3 has uplink subframes which are a superset of other configurations in the same group. As such configuration 3 PUSCH transmission & PUSCH HARQ timing is utilised for subset2 206. FIG. 10 illustrates PUSCH transmission and PUSCH HARQ timing for configuration 3 in subset 2 timing utilising the timing table defined under current 3GPP standards for LTE TDD.

As will be appreciated by those of skill in the art the flexible TDD design of the present invention may enable an inter cell interference mitigation scheme to be realised in predictive manner. For example an appropriate interference mitigation scheme could be used to alleviate the DL interference from fixed DL subframe#7 in sub set#2 to fixed UL subframe#7 in subset#1. Likewise an appropriate interference mitigation scheme could be used to alleviate the DL interference from fixed DL subframes#8 and #9 in subset#2 to flexible UL subframe#8 & 9 in designed subset1.

The above-mentioned processing may be executed by a computer (for example, eNB/UE). Also, it is possible to provide a computer program which causes a programmable computer device to execute the above-mentioned processing. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The software modules may be provided to a computer using any type of transitory computer readable media. Examples of transitory computer readable media include electric signals, optical signals, and electromagnetic waves. Transitory computer readable media can provide the software modules to a computer via a wired communication line (e.g. electric wires, and optical fibers) or a wireless communication line.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein. In other words, it will be understood by those of ordinary skill in the art that various changes in form and details may be made therein without departing from the spirit and scope of the present invention as defined by the claims. For example, the present invention can be implemented in the following forms.

(1) A communications node for use in a communications system in which the communications node is adapted to: transmit to user equipments (UEs) within a node coverage area a first uplink-downlink configuration within a first time interval; and transmit to selected user equipments (UEs) within the node coverage area secondary uplink-downlink configurations over a plurality of secondary time intervals within the first time interval, in which the secondary uplink-downlink configurations contain information on reconfigurable subframes within the first uplink-downlink configuration which can be reconfigured by the communications node for use by one or more of the selected UEs.

(2) The communications node of Item (1), in which the communications network is an LTE network and the communications node is configured for operation at LTE Release 11 or higher.

(3) The communications node of Item (2), in which the communications node services one or more UEs configured for operation on LTE release 8, LTE Release 9 and/or LTE Release 10.

(4) The communications node of Item (2) or Item (3), in which the secondary uplink- downlink configuration is transmitted to UEs configured for operation on LTE release 11 or higher.

(5) The communications node of Item (1), in which the first uplink-downlink configuration is broadcast using system information block type 1 (SIB1) and the first time interval has a typical period of 640 ms.

(6) The communications node of Item (1), in which the secondary uplink-downlink configurations are transmitted to the selected UEs in accordance with a fast signalling approach.

(7) The communications node of Item (1), in which the secondary-uplink downlink configurations are derived from time division duplex (TDD) uplink (UL)-downlink (DL) configurations under LTE TDD standards.

(8) The communications node of Item (7), in which the TDD UL-DL configurations are divided into groups based on the uplink to downlink switch point periodicity.

(9) The communications node of Item (8), in which the reconfigurable subframes are identified in each group of uplink-downlink configurations by identifying subframes common to all configurations within a group and assigning the remaining subframes as reconfigurable subframes.

(10) The communications node of Item (6), in which the secondary uplink-downlink configurations are transmitted as downlink control information (DCI).

(11) The communications node of Item (10), in which cyclic redundancy check (CRC) of the DCI is scrambled using a radio network temporary identifier (RNTI) which indicates that the DCI is utilised for fast uplink-downlink reconfiguration.

(12) The communications node of Item (10), in which each secondary time interval has a duration of at least one radio frame and the DCI is transmitted within the first downlink subframe of each secondary time interval.

(13) The communications node of Item (12), in which the DCI includes information on a TDD configuration of the current frame and the next incoming frame.

(14) The communications node of Item (10), in which each secondary time interval has a duration of at least one radio frame and the DCI is transmitted over a first downlink subframe in the first half of the secondary time interval and a predetermined second downlink subframe in the second half of the secondary time interval within each secondary time interval.

(15) The communications node of Item (14), in which the DCI transmitted within the first downlink subframe includes information on a TDD configuration of a current frame and the DCI transmitted on the second downlink subframe includes information on a TDD configuration of a next frame.

(16) The communications node of any one of Items (8) to (15), in which physical downlink shared channel (PDSCH) hybrid automatic repeat request (HARQ) timing, in each group, is based on PDSCH HARQ timing of the uplink-downlink configuration within the selected group that has downlink subframes which are a superset of other configurations in the same group.

(17) The communications node of any one of Items (8) to (15), in which physical uplink shared channel (PUSCH) transmission and PUSCH hybrid automatic repeat request (HARQ) timing for a group is based on the PUSCH transmission and PUSCH HARQ timing of the uplink-downlink configuration that has uplink subframes which are superset of other configurations in the same group.

(18) A method of configuring uplink-downlink configuration allocations for a user equipment (UE) within the coverage area of a communications node of a communications network, the method including: transmitting to each UE within a node coverage area a first uplink-downlink configuration; and transmitting to selected user equipments (UEs) within the node coverage area secondary uplink-downlink configurations over a plurality of secondary time intervals within the first time interval, in which the secondary uplink-downlink configurations contain information on reconfigurable subframes within the uplink-downlink configuration which can be reconfigured by the communications node for use by one or more of the selected UEs.

(19) A user equipment for use in a communications network, the user equipment adapted to: receive a first uplink-downlink configuration over a first time interval from a servicing node within a communications network; and receive secondary uplink-downlink configurations from said servicing node over a plurality of secondary time intervals within the first time interval, in which the secondary uplink-downlink configurations contain information on reconfigurable subframes within the uplink-downlink configuration which can be reconfigured by the servicing node for use by the user equipment and in which the user equipment is adapted to provide feedback to the servicing node to enable the servicing node to configure the reconfigurable subframes as uplink or downlink subframes.

(20) A method implemented in a user equipment for use in a communications network, the method comprising: receiving a first uplink-downlink configuration over a first time interval from a servicing node within a communications network; and receiving secondary uplink-downlink configurations from said servicing node over a plurality of secondary time intervals within the first time interval, in which the secondary uplink-downlink configurations contain information on reconfigurable subframes within the uplink-downlink configuration which can be reconfigured by the servicing node for use by the user equipment, and in which the user equipment is adapted to provide feedback to the servicing node to enable the servicing node to configure the reconfigurable subframes as uplink or downlink subframes.

(21) A communications system comprising: user equipments (UEs); and a communications node to transmit to the UEs within a node coverage area a first uplink-downlink configuration within a first time interval, in which the communications node transmits to selected user equipments (UEs) within the node coverage area secondary uplink-downlink configurations over a plurality of secondary time intervals within the first time interval, and in which the secondary uplink-downlink configurations contain information on reconfigurable subframes within the first uplink-downlink configuration which can be reconfigured by the communications node for use by one or more of the selected UEs.

(22) A method implemented in a communications system, the method comprising: transmitting from a communications node to user equipments (UEs) within a node coverage area a first uplink-downlink configuration within a first time interval; and transmitting from the communications node to selected user equipments (UEs) within the node coverage area secondary uplink-downlink configurations over a plurality of secondary time intervals within the first time interval, in which the secondary uplink-downlink configurations contain information on reconfigurable subframes within the first uplink-downlink configuration which can be reconfigured by the communications node for use by one or more of the selected UEs.

(23) A communications node for use in a communications system in which the node is adapted to: transmit to user equipment (UEs) within the nodes coverage area a first uplink downlink configuration within a first time interval; transmit to selected user equipment (UEs) within the nodes coverage area secondary uplink downlink configurations over a plurality of secondary time intervals within the first time interval; in which the secondary uplink downlink configurations contain information on reconfigurable subframes within the uplink downlink configuration which can be reconfigured by the node for use by one or more of the selected UEs.

(24) The communications node of Item (23), in which the communications network is an LTE network and the node is configured for operation at LTE Release 11 or higher.

(25) The communications node of Item (24), in which the node services one or more UEs configured for operation on LTE release 8, LTE Release 9 and/or LTE Release 10.

(26) The communications node of Item (24) or Item (25), in which the secondary uplink downlink configuration is transmitted to UEs configured for operation on LTE release 11 or higher.

(27) The communications node of any one of Items (24) to (26), in which the first uplink downlink configuration is broadcast using System Information Block type 1 (SIB1) and the first time interval has a typical period of 640 ms.

(28) The communications node of any one of Items (24) to (27), in which the secondary uplink downlink configurations are transmitted to the selected UEs in accordance with a fast signalling approach.

(29) The communications node of any one of Items (23) to (28), in which the secondary uplink downlink configurations are derived from the available TDD UL-DL configurations under the LTE TDD standard.

(30) The communications node of Item (29), in which the available TDD UL-DL configurations are divided into groups based on the uplink to downlink switch point periodicity.

(31) The communications node of Item (30), in which the reconfigurable subframes are identified in each group of uplink downlink configurations by identifying subframes common to all configurations within a group and assigning the remaining subframes as reconfigurable subframes.

(32) The communications node of any one of Items (28) to (31), in which the secondary uplink-downlink configurations are transmitted as specific Downlink Control Information (DCI).

(33) The communications node of Item (32), in which the DCI's CRC is scrambled using a Radio Network Temporary Identifier (RNTI) which indicates that the DCI is utilised for fast uplink downlink reconfiguration.

(34) The communications node of Item (32) or (33), in which each secondary time interval has a duration of at least one radio frame and the DCI is transmitted within the first downlink subframe of each secondary time interval.

(35) The communications node of Item (34), in which the DCI includes information on the TDD configuration of the current frame and the next incoming frame.

(36) The communications node of Item (32) or (33), in which each secondary time interval has a duration of at least one radio frame and the DCI is transmitted over a first downlink subframe in the first half of the secondary time interval and a predetermined second downlink subframe in the second half of the secondary time interval within each secondary time interval.

(37) The communications node of Item (36), in which the DCI transmitted within the first downlink subframe includes information on the TDD configuration of the current frame and the DCI transmitted on the second downlink subframe includes information on the TDD configuration of the next incoming frame.

(38) The communications node of any one of Items (30) to (37), in which PDSCH HARQ timing, in a each group, is based on PDSCH HARQ timing of the uplink downlink configuration within the selected group that has downlink subframes which are a superset of other configurations in the same group.

(39) The communications node of any one of Items (30) to (38), in which PUSCH transmission and PUSCH HARQ timing for a group is based on the PUSCH transmission and PUSCH HARQ timing of the uplink downlink configuration that has uplink subframes which are superset of other configurations in the same group.

(40) A method of configuring uplink downlink allocations for user equipment (UE) within the coverage area of a communications node of a communications network, the method includes the steps of: transmitting to each UE within the node's coverage area a first uplink downlink configuration; transmitting to selected user equipment (UEs) within the nodes coverage area secondary uplink downlink configurations over a plurality of secondary time intervals within the first time interval, in which the secondary uplink downlink configurations contain information on reconfigurable subframes within the uplink downlink configuration which can be reconfigured by the node for use by one or more of the selected UEs.

(41) A portable communications device for use in a communications network, the portable communications device is adapted to: receive a first uplink downlink configuration over a first time interval from a servicing communications node within a communications network and receive secondary uplink downlink configurations from said servicing node over a plurality of secondary time intervals within the first time interval in which the secondary uplink downlink configurations contain information on reconfigurable subframes within the uplink downlink configuration which can be reconfigured by the node for use by the portable communications device and in which the portable communication device is adapted to provide feedback to the servicing node to enable the node to configure the reconfigurable subframes as uplink or downlink subframes.

(42) A communication system, said system includes one or more nodes as defined in Items (23) to (39), said nodes servicing one or more portable communication devices, and one or more portable communication devices as defined in Item (40).

This application is based upon and claims the benefit of priority from Australian provisional patent application No. 2012904479, filed on Oct. 12, 2012, the disclosure of which is incorporated herein in its entirely by reference. For example, the present invention can be implemented in the following forms.

REFERENCE SIGNS LIST

100 WIRELESS COMMUNICATION SYSTEM
101 EVOLVED NODEBS (eNB)
102 TIME DIVISION DUPLEX (TDD) RECONFIGURATION PROCESSING FUNCTION
103, 104 USER EQUIPMENT (UE)
105 TDD RECONFIGURATION PROCESSING FUNCTION
106 SYSTEM INFORMATION BLOCK TYPE 1 (SIB1)
107 DOWNLINK CONTROL INFORMATION (DCI)
108 PHYSICAL HYBRID AUTOMATIC REPEAT REQUEST INDICATOR CHANNEL (PHICH)
109 PHYSICAL UPLINK CONTROL CHANNEL (PUCCH)/PHYSICAL UPLINK SHARED CHANNEL (PUSCH)
200 FLEXIBLE SUBFRAMES
201, 202 GROUP
203, 204 SUBFRAMES
205 SUBSET1
206 SUBSET2
250 SYSTEM 251 to 254 TDD UPLINK (UL)-DOWNLINK (DL) CONFIGURATION
300 TRANSMISSION SCHEME
301, 302 TDD UL-DL CONFIGURATION
303 1$^{st}$ DL SUBFRAME
400 TRANSMISSION SCHEME
401, 402 TDD UL-DL CONFIGURATION
403, 403a DL SUBFRAME
500 TDD RECONFIGURATION
501, 502 UL SUBFRAME
503 DISCONTINUOUS TRANSMISSION & RECEPTION (DTX) BIT
504 UL SUBFRAME
505, 506 DISCONTINUOUS TRANSMISSION & RECEPTION (DTX) BIT

What is claimed is:

1. A communications method implemented in a communications node used in a communications system, the communications method comprising:
    transmitting, to one or more first user equipments (UEs), a first uplink-downlink (UL-DL) subframe configuration at least at a first time interval; and
    transmitting, to one or more second user equipments (UEs) included in said one or more first UEs, a secondary uplink-downlink (UL-DL) subframe configuration at least at a second time interval,
    wherein the secondary UL-DL subframe configuration contains information used for reconfiguring time division duplexing (TDD),
    wherein the secondary UL-DL subframe configuration indicates one of time division duplexing (TDD) UL-DL subframe configurations,
    wherein the secondary UL-DL subframe configuration is transmitted in downlink control information (DCI), and
    wherein the secondary UL-DL subframe configuration is repeated at least at a second time interval of one radio frame, and the DCI is transmitted in a first downlink subframe in a first half of the second time interval and a predetermined second downlink subframe in a second half of the second time interval.

2. The communications method as in claim 1,
    wherein the first time interval is 640 ms, and
    wherein the second time interval is 10 ms, 40 ms, or between 10 ms and 40 ms.

3. The communications method as in claim 1, wherein the first uplink-downlink (UL-DL) subframe configuration is transmitted in a system information block type 1 (SIB1) message.

4. The communications method as in claim 1, wherein the first uplink-downlink (UL-DL) subframe configuration is transmitted semi-statically.

5. The communications method as in claim 1,
    wherein the secondary uplink-downlink (UL-DL) subframe configuration indicates a UL-DL subframe configuration having downlink subframes which are a superset of downlink subframes in other uplink-downlink (UL-DL) subframe configurations.

6. The communications method as in claim 1,
    wherein the secondary uplink-downlink (UL-DL) subframe configuration indicates a UL-DL subframe configuration having downlink subframes common to other uplink-downlink (UL-DL) subframe configurations.

7. The communications method as in claim 1,
    wherein the secondary uplink-downlink (UL-DL) subframe configuration indicates a UL-DL subframe configuration used as a DL hybrid automatic repeat request (HARQ) reference configuration.

8. The communications method as in claim 1,
    wherein a cyclic redundancy check (CRC) of the DCI is scrambled by an enhanced interference management and traffic adaptation (eIMTA)-radio network temporary identifier (RNTI).

9. The communications method as in claim 8,
    wherein the DCI scrambled by the eIMTA-RNTI indicates that the DCI is for TDD UL/DL reconfiguration.

10. The communications method as in claim 1,
    wherein the second time interval is one radio frame, and the DCI is transmitted at least in a first downlink subframe of the second time interval.

11. The communications method as in claim 1,
    wherein the DCI indicates an uplink-downlink (UL-DL) configuration of radio frame n and next incoming radio frame (n+1),
    wherein n is an integer.

12. A communications method implemented in a user equipment (UE) used in a communications system, the communications method comprising:
    receiving, from a communication node, a first uplink-downlink (UL-DL) subframe configuration at least at a first time interval; and
    receiving, from the communication node, a secondary uplink-downlink (UL-DL) subframe configuration at least at a second time interval,
    wherein the secondary UL-DL subframe configuration contains information used for reconfiguring time division duplexing (TDD),
    wherein the secondary UL-DL subframe configuration indicates one of time division duplexing (TDD) UL-DL subframe configurations,
    wherein the secondary UL-DL subframe configuration is transmitted in downlink control information (DCI), and
    wherein the secondary UL-DL subframe configuration is repeated at least at a second time interval of one radio frame, and the DCI is transmitted in a first downlink subframe in a first half of the second time interval and a predetermined second downlink subframe in a second half of the second time interval.

13. A communications node used in a communications system, the communications node comprising:
    a processor; and
    a memory that stores instructions to be executed by the processor by causing the processor to execute:
        a transmitter configured to transmit, to one or more first user equipments (UEs), a first uplink-downlink (UL-DL) subframe configuration at least at a first time interval and, to one or more second user equipments (UEs) included in said one or more first UEs, a secondary uplink-downlink (UL-DL) subframe configuration at least at a second time interval,
        wherein the secondary UL-DL subframe configuration contains information used for reconfiguring time division duplexing (TDD),
        wherein the secondary UL-DL subframe configuration indicates one of time division duplexing (TDD) UL-DL subframe configurations,
        wherein the secondary UL-DL subframe configuration is transmitted in downlink control information (DCI), and
        wherein the secondary UL-DL subframe configuration is repeated at least at a second time interval of one radio frame, and the DCI is transmitted in a first downlink subframe in a first half of the second time interval and a predetermined second downlink subframe in a second half of the second time interval.

14. A user equipment (UE) used in a communications system, the user equipment comprising:
a processor; and
a memory that stores instructions to be executed by the processor by causing the processor to execute:
a receiver configured to receive, from a communication node, a first uplink-downlink (UL-DL) subframe configuration at least at a first time interval and, from the communication node, a secondary uplink-downlink (UL-DL) subframe configuration at least at a second time interval,
wherein the secondary UL-DL subframe configuration contains information used for reconfiguring time division duplexing (TDD),
wherein the secondary UL-DL subframe configuration indicates one of time division duplexing (TDD) UL-DL subframe configurations,
wherein the secondary UL-DL subframe configuration is transmitted in downlink control information (DCI), and
wherein the secondary UL-DL subframe configuration is repeated at least at a second time interval of one radio frame, and the DCI is transmitted in a first downlink subframe in a first half of the second time interval and a predetermined second downlink subframe in a second half of the second time interval.

15. A communications system comprising:
one or more first user equipments (UEs) including one or more second user equipments (UEs);
a communications node to transmit, to said one or more first user equipments (UEs), a first uplink-downlink (UL-DL) subframe configuration at least at a first time interval and, to said one or more second user equipments (UEs), a secondary uplink-downlink (UL-DL) subframe configuration at least at a second time interval,
wherein the secondary UL-DL subframe configuration contains information used for reconfiguring time division duplexing (TDD),
wherein the secondary UL-DL subframe configuration indicates one of time division duplexing (TDD) UL-DL subframe configurations,
wherein the secondary UL-DL subframe configuration is transmitted in downlink control information (DCI), and
wherein the secondary UL-DL subframe configuration is repeated at least at a second time interval of one radio frame, and the DCI is transmitted in a first downlink subframe in a first half of the second time interval and a predetermined second downlink subframe in a second half of the second time interval.

* * * * *